United States Patent
Pelfrey et al.

(10) Patent No.: US 8,613,189 B1
(45) Date of Patent: Dec. 24, 2013

(54) CENTRIFUGAL IMPELLER FOR A ROCKET ENGINE HAVING HIGH AND LOW PRESSURE OUTLETS

(75) Inventors: Philip C Pelfrey, Jupiter, FL (US); Alex Pinera, Jupiter, FL (US)

(73) Assignee: Florida Turbine Technologies, Inc., Jupiter, FL (US)

(*) Notice: Subject to any disclaimer, the term of this patent is extended or adjusted under 35 U.S.C. 154(b) by 892 days.

(21) Appl. No.: 12/627,663

(22) Filed: Nov. 30, 2009

(51) Int. Cl.
*F02K 9/00* (2006.01)
*F02K 9/46* (2006.01)
*F02K 9/50* (2006.01)

(52) U.S. Cl.
USPC ............. 60/246; 60/257; 60/258; 416/201 R

(58) Field of Classification Search
USPC ........ 60/246, 257–260; 415/204, 206, 83–84, 415/86–87; 416/183, 185, 186 R, 201 R, 416/201 A
See application file for complete search history.

(56) References Cited

U.S. PATENT DOCUMENTS

| | | | | |
|---|---|---|---|---|
| 2,410,333 A * | 10/1946 | Barkeij | ...................... | 477/60 |
| 3,408,817 A * | 11/1968 | Nehrkorn et al. | ............. | 60/246 |
| 3,430,921 A * | 3/1969 | Dewey | ...................... | 417/348 |
| 3,570,249 A * | 3/1971 | Baum | ...................... | 60/259 |
| 3,672,165 A * | 6/1972 | Baum | ...................... | 60/39.48 |
| 3,769,789 A * | 11/1973 | Niggemann | ................ | 60/664 |
| 4,195,473 A * | 4/1980 | Aspinwall | .................. | 60/794 |
| 4,589,253 A * | 5/1986 | Wagner | ...................... | 60/204 |
| 5,609,016 A * | 3/1997 | Yamada et al. | .............. | 60/779 |
| 5,819,524 A * | 10/1998 | Bosley et al. | ............. | 60/39.465 |
| 7,389,636 B2 * | 6/2008 | Fowler et al. | ................. | 60/204 |

* cited by examiner

*Primary Examiner* — William H Rodriguez
*Assistant Examiner* — Carlos A Rivera
(74) *Attorney, Agent, or Firm* — John Ryznic

(57) ABSTRACT

A centrifugal impeller with a single inlet and dual outlets that include a low pressure outlet and a high pressure outlet. The impeller includes low pressure blades with high pressure blades located downstream. The impeller can be shrouded or unshrouded, and can include an inner shroud that forms a flow path for the low pressure fluid and a high pressure flow path for the high pressure fluid. The impeller can include a high pressure volute and a low pressure volute that forms a dual volute with dual diffusers for both fluids.

4 Claims, 8 Drawing Sheets

CENTRIFUGAL IMPELLER FOR A ROCKET ENGINE HAVING HIGH AND LOW PRESSURE OUTLETS

GOVERNMENT LICENSE RIGHTS

None.

CROSS-REFERENCE TO RELATED APPLICATIONS

None.

BACKGROUND OF THE INVENTION

1. Field of the Invention

The present invention relates generally to a centrifugal impeller, and more specifically to a centrifugal impeller for a rocket engine.

2. Description of the Related Art Including Information Disclosed Under 37 CFR 1.97 and 1.98

Centrifugal impellers are used in rocket engines to deliver high pressure fluid to a main combustion chamber. The centrifugal impeller includes an axial inlet and a radial outlet. The prior art centrifugal impeller has a single radial outlet that is at the highest pressure that the impeller can produce. Some of the radial outlet fluid is bled off and used in other parts of the engine. However, this bleed off fluid is at the higher pressure and must be lowered in pressure for use in other parts. This results in a waste of energy since the work to increase the fluid pressure used in the bleed off fluid is not used in the engine. In a rocket engine, the work performed on the fluid to produce the high pressure also increases the fluid temperature and thus the amount of power needed from the turbine. The extra power needed usually results in increased turbine temperature. The increased power required to pump the fluid to the higher pressure will increase the turbine temperature.

BRIEF SUMMARY OF THE INVENTION

It is an object of the present invention to provide centrifugal impeller with a high pressure outlet and a lower pressure outlet in a single impeller.

It is an object of the present invention to provide for a rocket engine with a lower turbine temperature.

The above objectives and more are achieved with the centrifugal impeller of the present invention that includes an axial inlet and a radial outlet where the radial outlet includes a high pressure outlet and a low pressure outlet opening at a radial inward location from the high pressure outlet. The impeller can be a shrouded or unshrouded impeller with the option of having an inner shroud separating the fluid flow to the high pressure outlet from the fluid flow to the low pressure outlet.

The centrifugal impeller includes a high pressure discharge and a low pressure discharge separate from one another. These discharges can be of a multitude of configurations including a volute for each discharge. The centrifugal impeller can include a diffuser for each of the two outlets to diffuse the fluid being discharged. The impeller can include splitters with dual volutes, or without splitters but with dual volutes. Or, the impeller can include dual diffuser with split volute. In another embodiment, the impeller includes a co-annulus dual shroud impeller, or even a co-annulus single shroud impeller. In another embodiment, the impeller is a co-annulus partial single shroud impeller.

In a rocket engine with a turbo-pump, the impeller is used to deliver a high pressure fluid from a fuel or oxidizer tank to a main combustion chamber. The impeller also supplies low pressure fluid for use by other components such as a jet pump that is located at an inlet to the impeller to provide a driving force for the fluid of the jet pump and pre-pressurize the fluid entering the impeller.

DETAILED DESCRIPTION OF THE INVENTION

Figure 1:
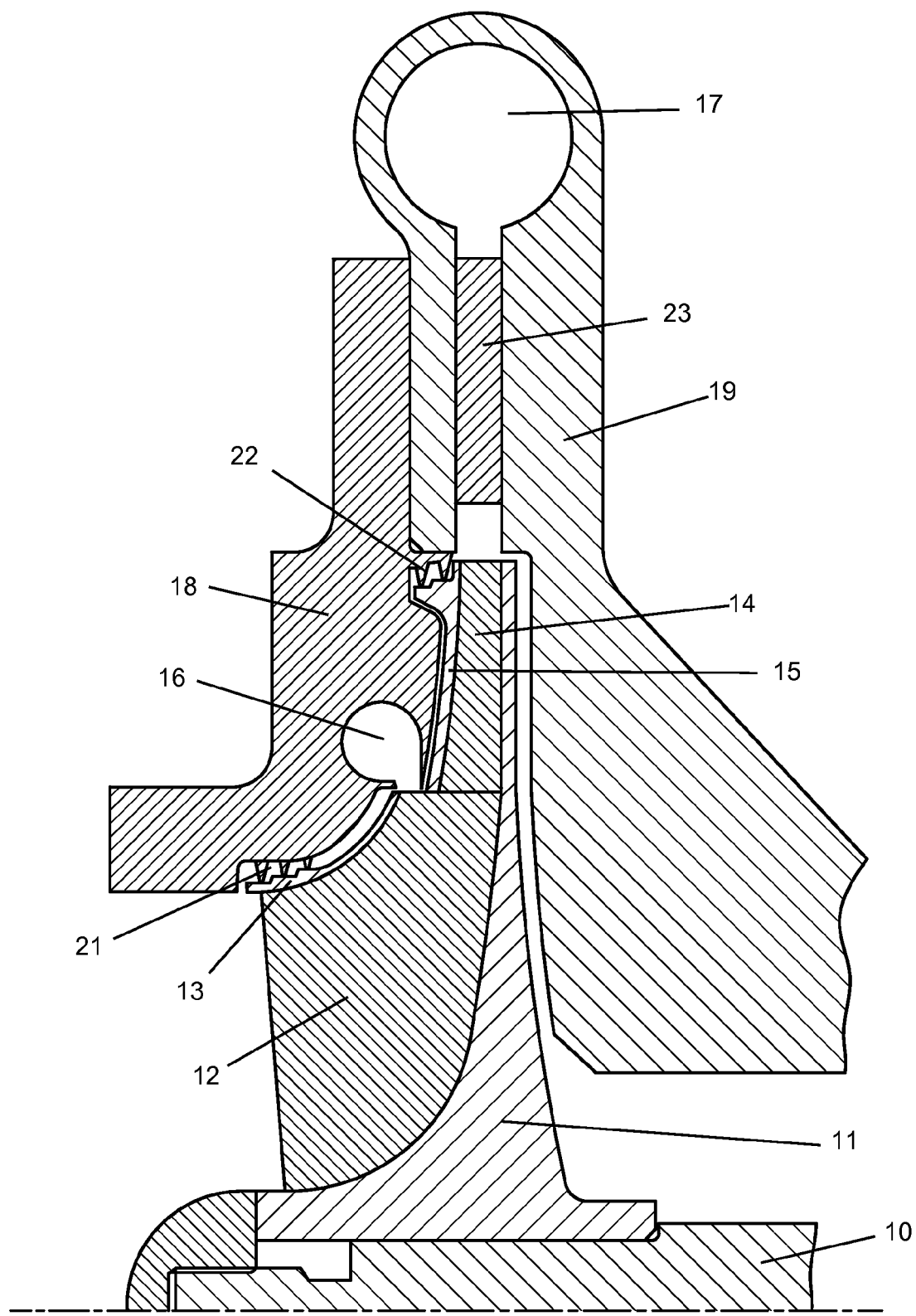
FIG. 1 shows a cross section view of an impeller of the present invention with splitters and dual volutes.

The impeller of the present invention includes two outlets for delivering a high pressure fluid and a low pressure fluid from the same impeller to two different locations. The impeller of the present invention is intended for use in a rocket engine so that a low pressure fluid can be used for a jet pump without bleeding off the high pressure fluid and then lowering its pressure for use elsewhere. FIG. 1 shows a first embodiment of the impeller and includes an impeller 11 rotatably connected to a rotor shaft 10, a full length blade 12 extending from the impeller 11 and having an axial inlet and a radial outlet, an outer shroud 13 for the low pressure fluid and an outer shroud 15 for the high pressure fluid, a partial blade or splitter blade 14 located on the radial end of the impeller that produces the high pressure fluid, a low pressure volute 16 that receives the low pressure fluid from the impeller blades 12 and 14 (or, 12 and 24), a high pressure volute 17 that receives the high pressure fluid from the impeller blades 12 and 14, a diffuser 23 between the high pressure outlet and the high pressure volute 17, and labyrinth seals 21 and 22 between the low pressure housing 18 and the high pressure housing 19 to form a seal between the static housing and the rotating shrouded or unshrouded blades 12.

The various impellers of the figures show the low pressure outlet for the impeller to be in the radial direction. However, the impeller could be so shaped such that the low pressure outlet would be in a direction having both a radial component and an axial component in which the radial component dominates (is greater than the axial component) by forming the outer edge of the low pressure discharge path perpendicular to the rotational axis of the impeller and using the housing to redirect the low pressure fluid discharge toward the radial direction and into the low pressure volute or discharge.

The impeller of FIG. 1 operates as follows. Fluid enters the inlet in an axial flow and is pumped by the rotating blades 12 radial outward. Some of the fluid enters the low pressure volute 16 at a low pressure compared to the high pressure fluid that flows into the partial blades 14 and into the high pressure volute 17. The percentage of fluid that enters the low pressure volute 16 would depend upon the outlet size leading into the low pressure volute 16 compared to the outlet size leading into the high pressure volute 17. Because the fluid entering the low pressure volute 16 is discharged at a location radial inward from the outlet from the high pressure outlet, the fluid has less work performed on it and is therefore at a lower pressure.

Figure 2:
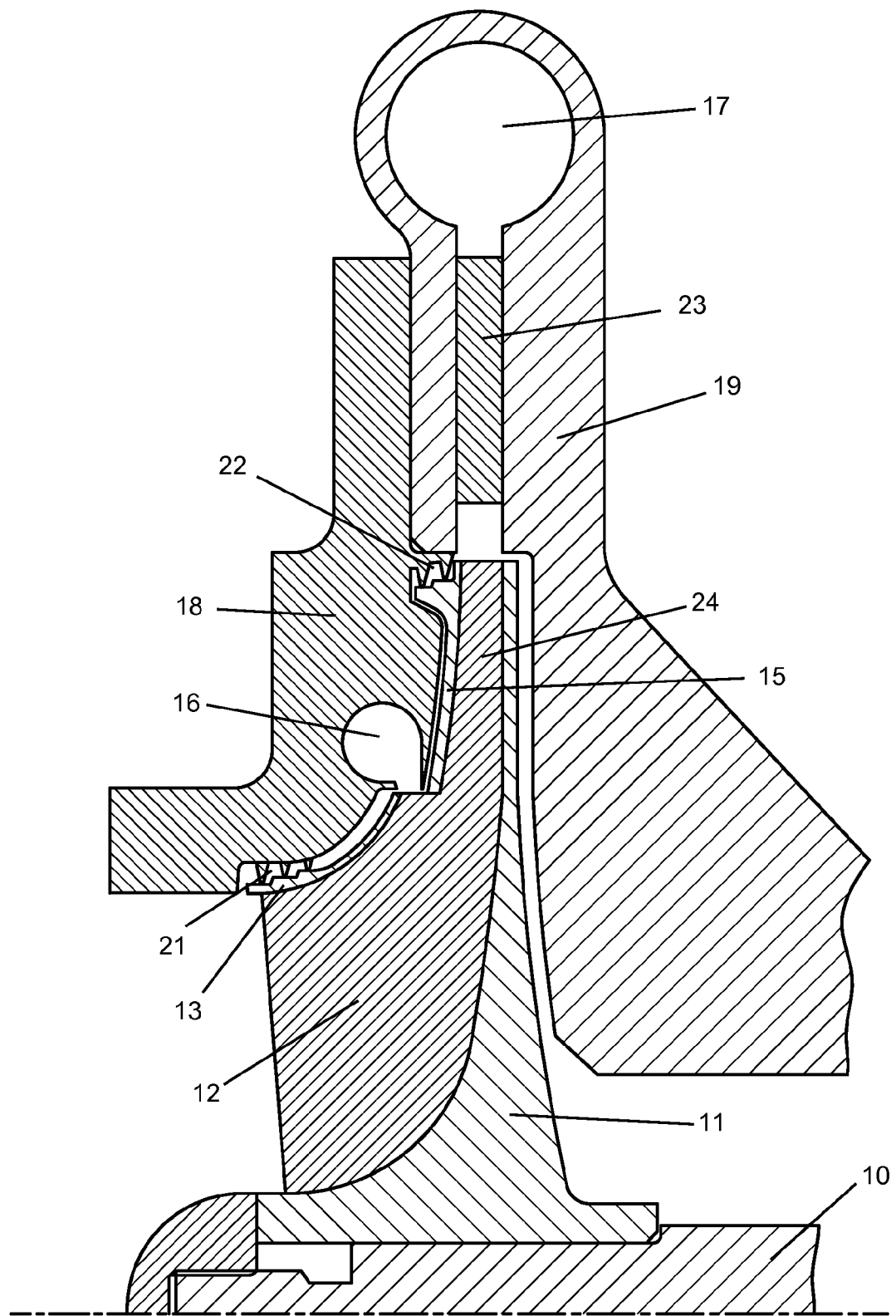
FIG. 2 shows a cross section view of an impeller of the present invention without splitters but with dual volutes.

FIG. 2 shows another embodiment of the impeller but without splitters. The blades 12 include the high pressure fluid section 24 that is without the splitters used in the FIG. 1 impeller. The remaining features of the impeller are the same as in FIG. 1. The low pressure fluid from the impeller blades 12 enters the low pressure volute 16 while the high pressure fluid enters the high pressure volute 17. Because the discharge of the low pressure fluid is radial inward from the discharge of the high pressure fluid, less work is performed on the low pressure fluid.

Figure 3:
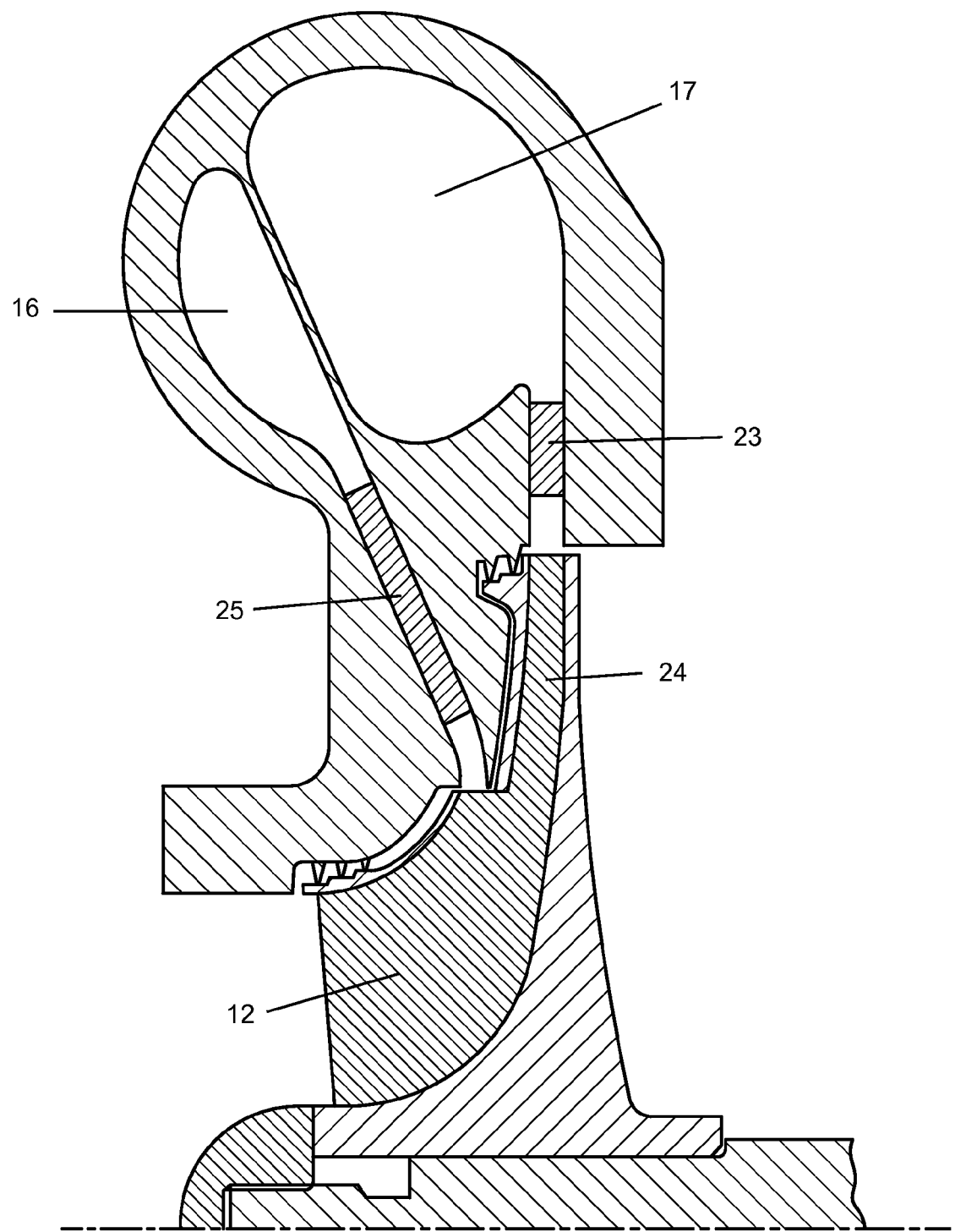
FIG. 3 shows a cross section view of an impeller of the present invention with dual diffusers and split volutes.

FIG. 3 shows another embodiment of the impeller with dual diffusers and a split volute. A low pressure diffuser 25 is located between the low pressure outlet and the low pressure volute 16. The low pressure volute 16 and the high pressure volute 17 together form a rounded volute to form the split volute in which the rounded volute is split into two separate volutes as seen in FIG. 3.

Figure 4:
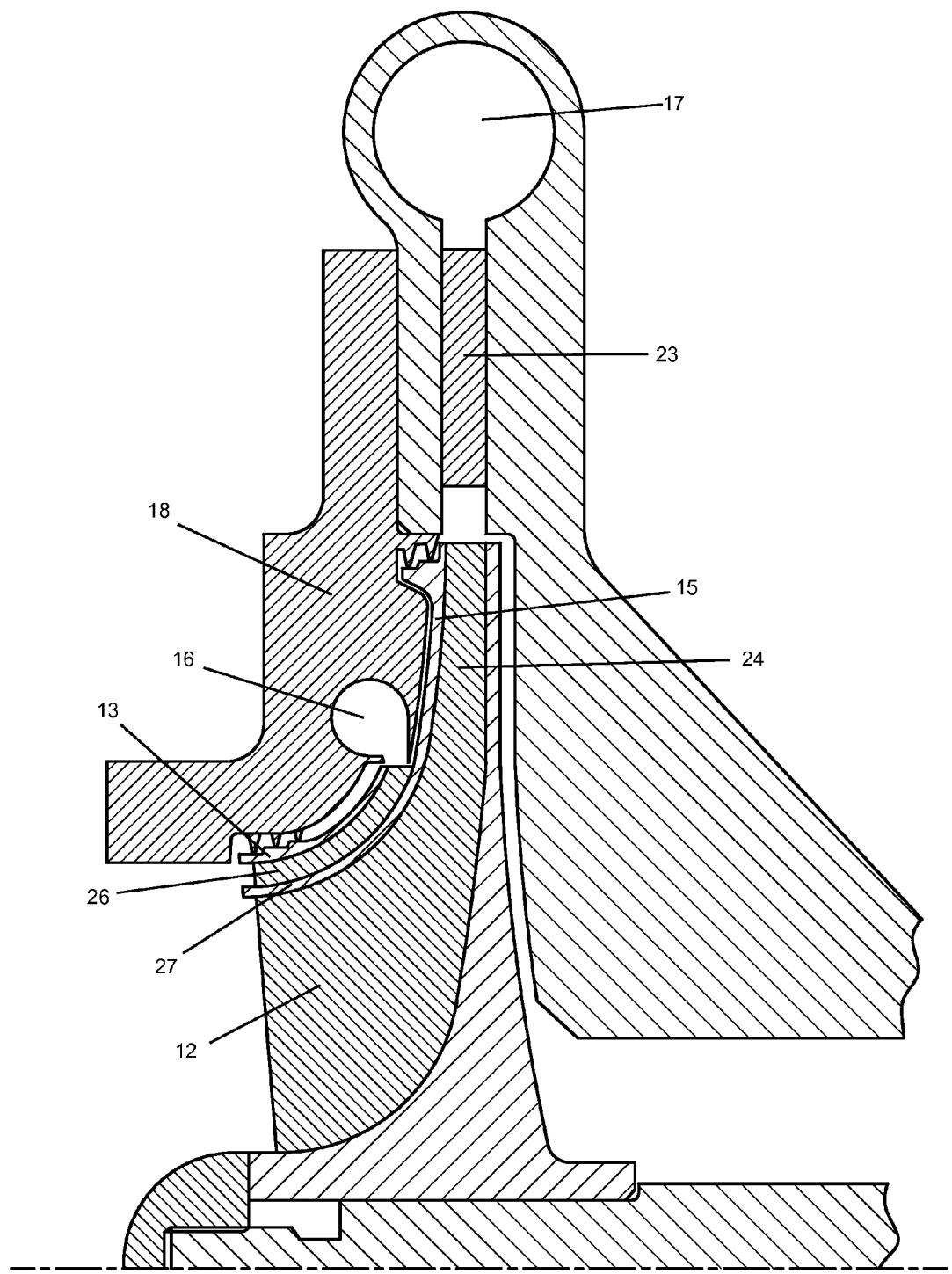
FIG. 4 shows a cross section view of an impeller of the present invention with a co-annulus dual shroud.

FIG. 4 shows another embodiment of the impeller with a co-annulus dual shrouded impeller. The impeller blades 12 include an inner shroud 27 and an outer shroud 13 that forms a low pressure fluid path 26 separate from the remaining path 12 that flows into the high pressure volute 17. The fluid that enters the impeller in an axial flow is split up into the low pressure path 26 and the high pressure path 12. Rotation of the impeller pressurizes the fluid into the low pressure fluid and the high pressure fluid. The co-annulus dual shrouded impeller enables the blading (the number of airfoils, the airfoil shape, and the airfoil geometry) within the outer flow path 26 to be unique and independent of the blading within the inner flow path 12.

Figure 5:
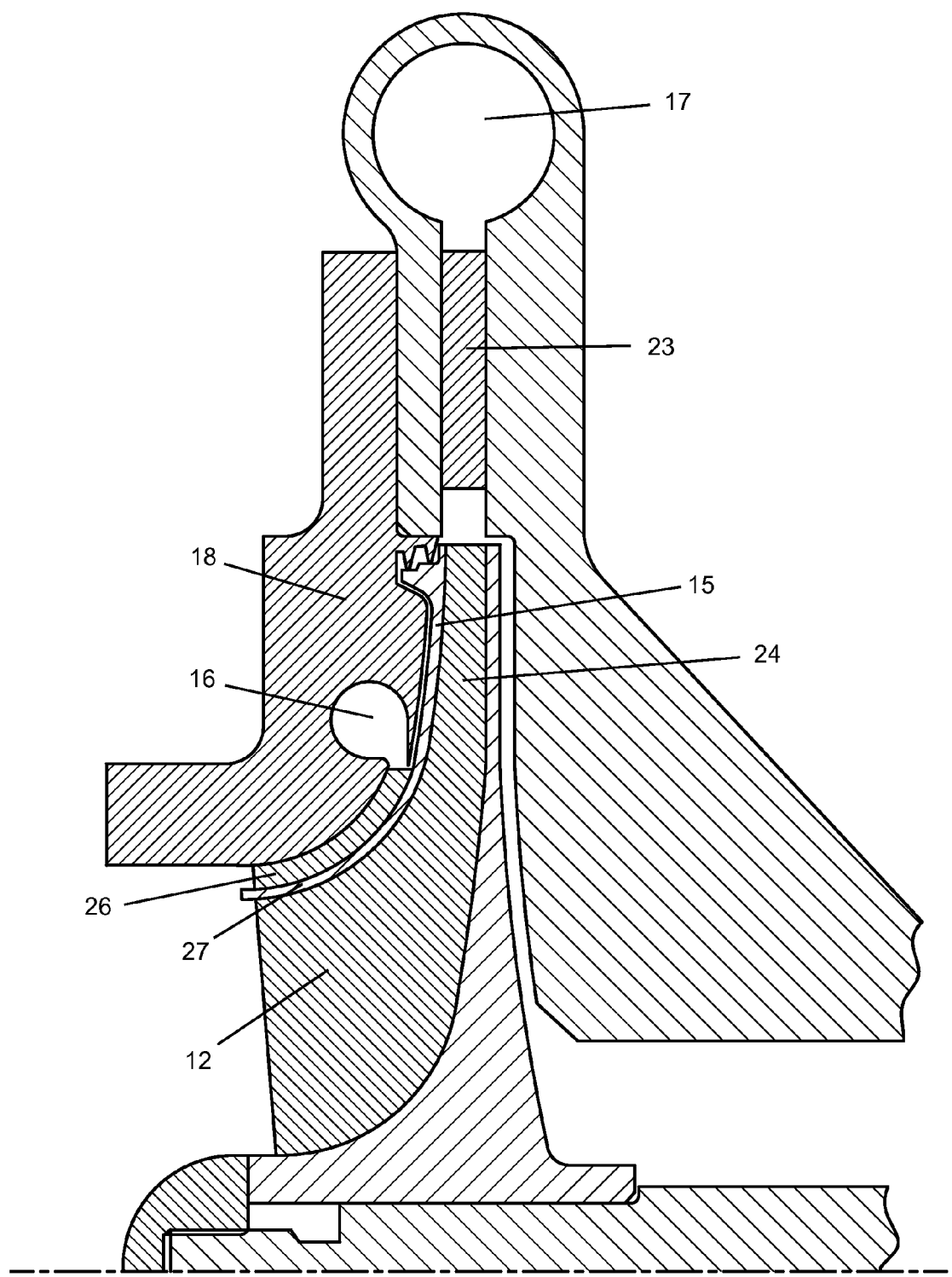
FIG. 5 shows a cross section view of an impeller of the present invention with a co-annulus single shroud.

FIG. 5 shows another embodiment of the impeller with co-annulus single shrouded impellers. The impeller blade 12 includes an inner shroud 27 as in the FIG. 4 embodiment, but does not include the outer shroud 13. A low pressure flow path 26 is formed separate from the high pressure fluid path 12 by the inner shroud 27. The low pressure housing surface forms a seal with the outer surface of the blades 12 where the low pressure flow path 26 is formed. Without the outer shroud 13 as in the previous embodiments, the impeller is easier to manufacture. The FIG. 5 embodiment still includes the outer shroud 15 with lab seal on the high pressure section of the impeller blades 24. The FIG. 5 embodiment also enables the independent flow path blading described above in the FIG. 4 embodiment.

Figure 6:
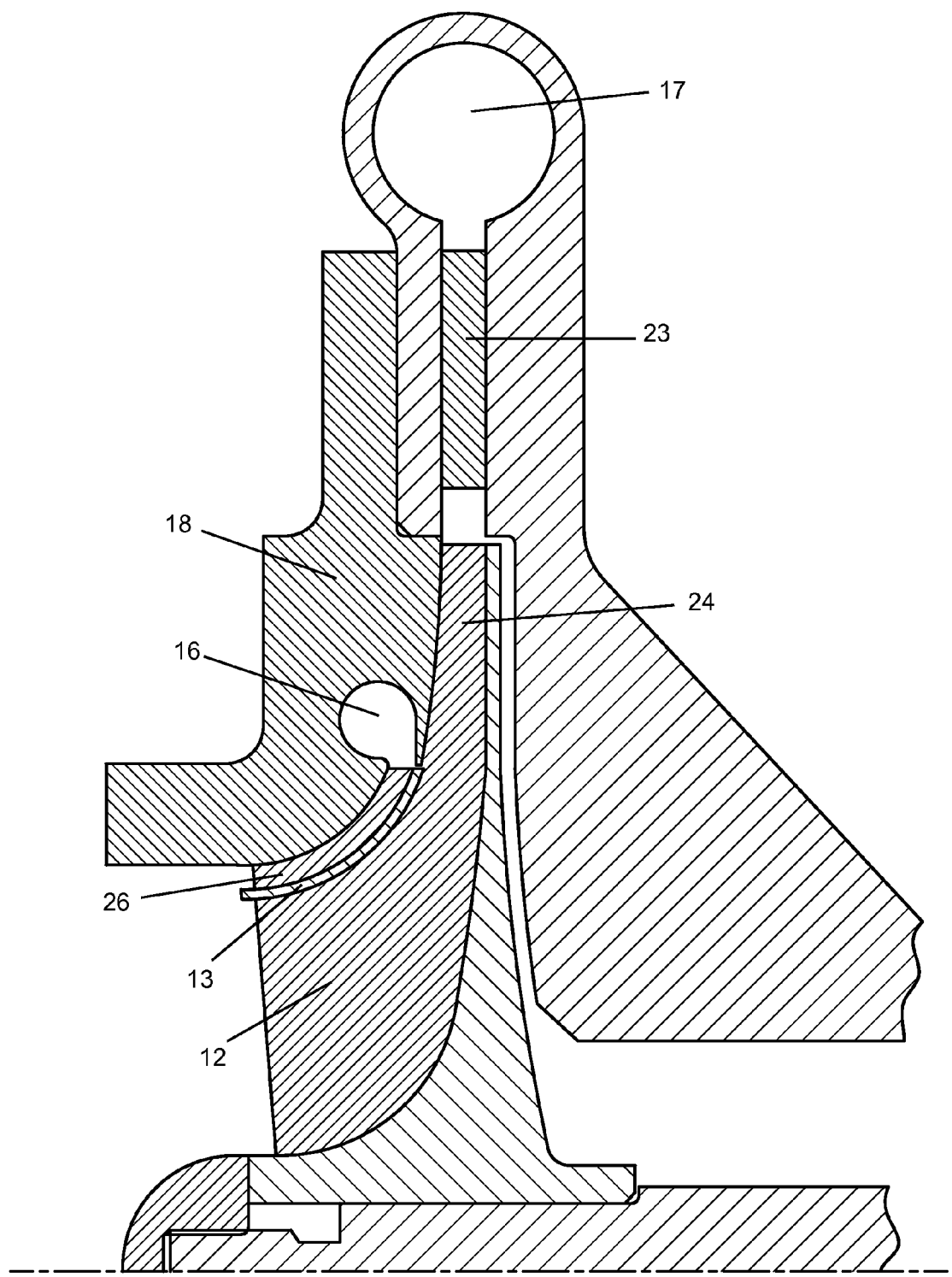
FIG. 6 shows a cross section view of an impeller of the present invention with a co-annulus partial single shroud.

The FIG. 6 embodiment of the impeller is like the FIG. 5 embodiment but without the outer shroud 15 on the high pressure blades 24. Both outer ends of the blades on the impeller are unshrouded to make manufacture of the impeller even easier. The two housing will form the seal with the rotating impeller blades.

Figure 7:
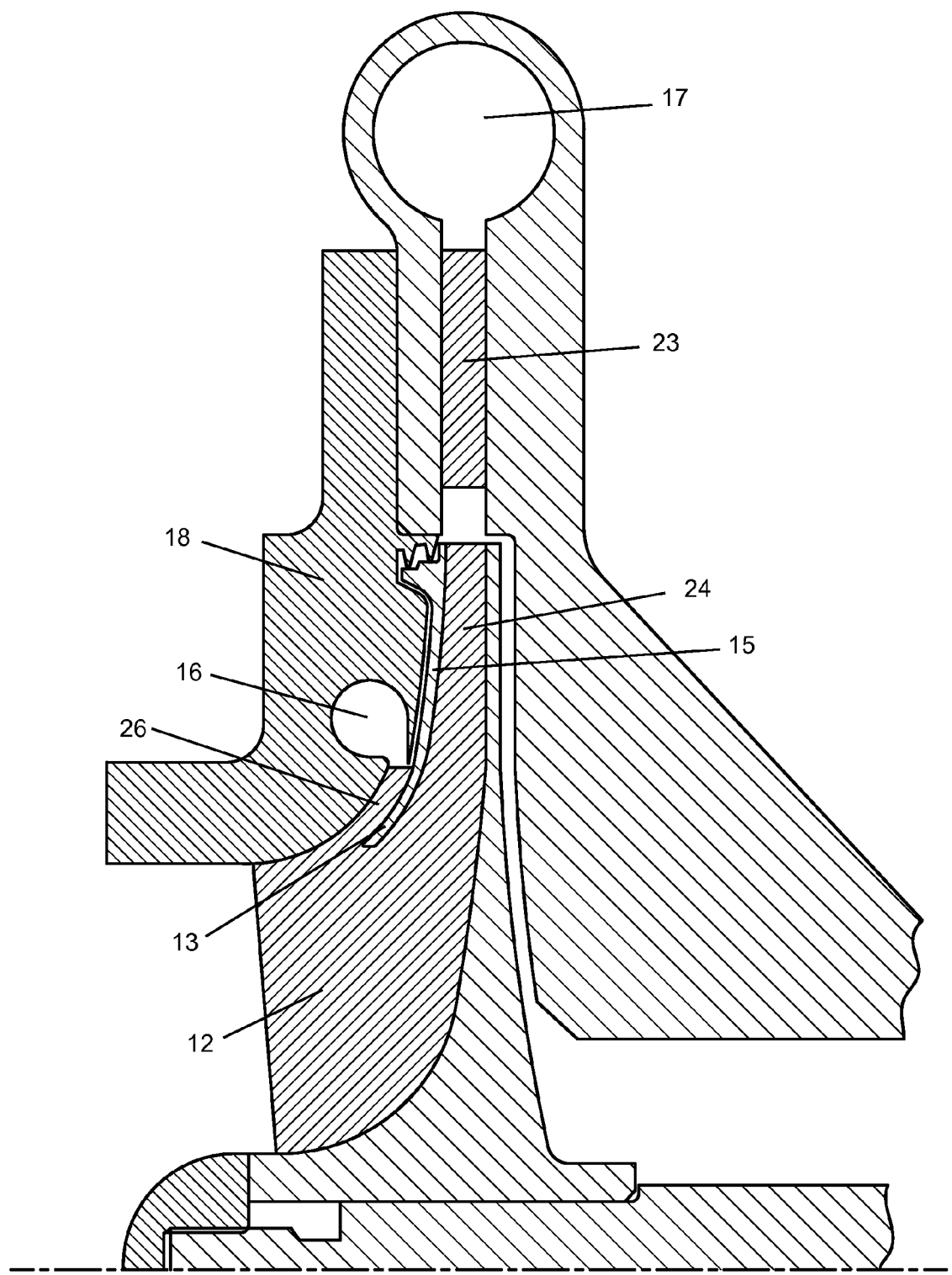
FIG. 7 shows a cross section view of an impeller of the present invention with a co-annulus dual shroud having a partial inner shroud.

FIG. 7 shows another embodiment of the impeller similar to the FIGS. 4 and 5 embodiments that has an inner shroud to separate the low pressure fluid path from the high pressure fluid path, but the inner shroud is shortened such that no inner shroud is present in the forward side. This forms a partial inner shroud embodiment of the impeller. This feature lowers the net positive suction head (NPSH) required component to FIGS. 4-6 while preserving the option to customize the blading at the exit of annulus 26.

Figure 8:
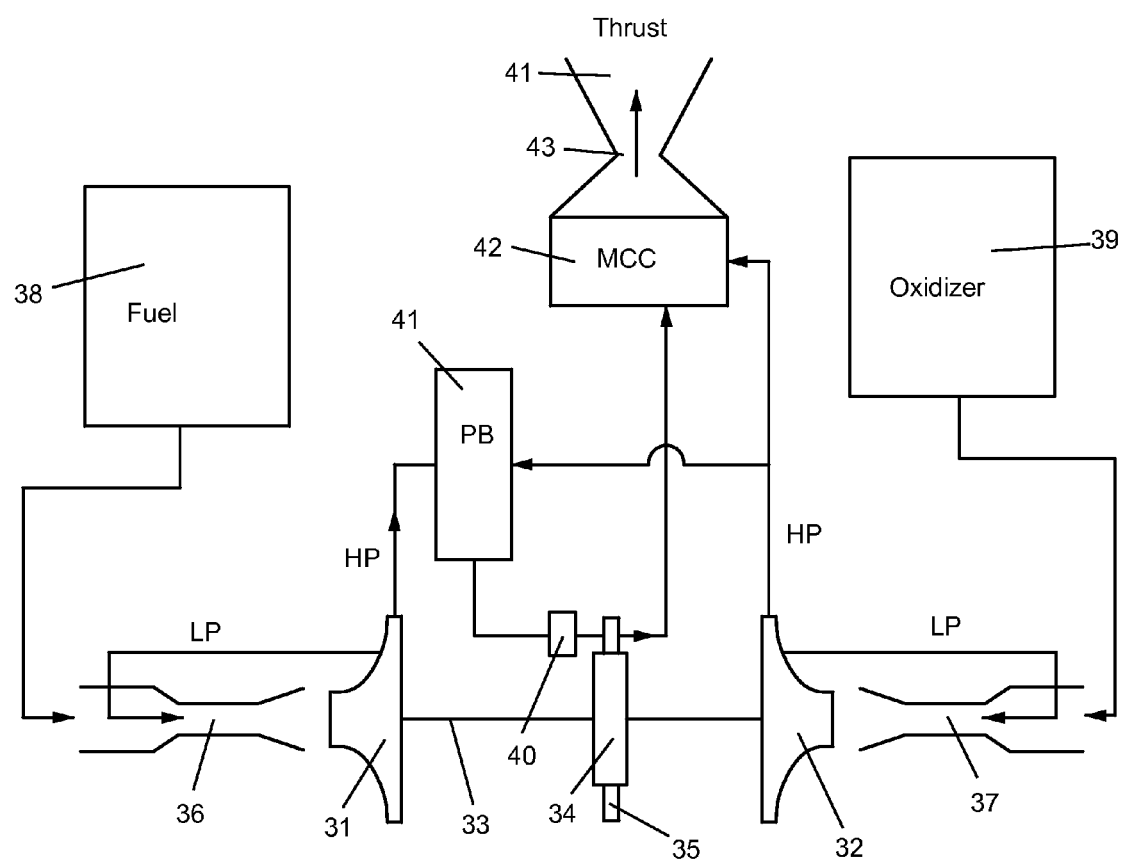
FIG. 8 shows a schematic view of a rocket engine using impellers of the present invention to pressurize the fuel and the oxidizer jet pumps.

FIG. 8 shows a rocket engine that uses the impeller of the present invention. The rocket engine includes a main combustion chamber 42 in which a fuel and an oxidizer is delivered from the turbo pump of the engine under high pressure. The combustion produces the hot gas flow that passes through a throat 43 and then expands within the nozzle 44 to produce thrust. The turbo pump includes a fuel impeller 31 and an oxidizer impeller 32 that are both connected to a common (can also be a different rotor shaft) rotor shaft 33 with a turbine 34 having turbine rotor blades 35 extending from the rotor that drives the rotor shaft 33 and thus the two impellers 31 and 32. The impellers 31 and 32 can be any one of the embodiments described above. Each impeller 31 and 32 includes an axial inlet for the fluid to be pumped, and a low pressure outlet and a high pressure outlet. The high pressure outlet feeds into a pre-burner 41 (for a staged combustion cycle, but could also be used for gas generator or an expender) for the fuel impeller 31 and the main combustion chamber for the oxidizer impeller 32. The low pressure outlets for the impellers 31 and 32 feed into an inlet of a jet pump 36 or 37 to provide the high pressure fluid used to force the lower pressure fluid through the jet pump and into the respective impeller 31 or 32.

The pre-burner 41 receives some of the pressurized oxidizer from the oxidizer impeller 32 to burn with the fuel from the fuel impeller 31 and produce a gas flow that enters the turbine through a guide vane 40 and drive the turbine 34 and rotor shaft 33. The gas flow from the turbine 34 is then delivered to the main combustion chamber 42 and mixed with the remaining oxidizer from the oxidizer impeller 32 to produce the combustion for the nozzle 44.

Because of the low pressure outlets for the two impellers 31 and 32, fluid from the high pressure outlet does not have to be used to drive the jet pumps 36 and 37. If high pressure fluid was bled off and used to drive the jet pumps 36 and 37, the pressure would have to be decreased. This would be wasted energy since the fluid would be increased in pressure beyond that required (which also increases its temperature) and then be decreased for use elsewhere in the system. The extra energy required to increase the pressure of the fluid to be used in the jet pumps would add to the heat created by the impellers and would also require a higher turbine temperature. If no extra work was required (as in the impeller of the present invention) to produce the low pressure fluid, then a lower turbine temperature can be achieved.

We claim the following:
1. A rocket engine comprising:
   a main combustion chamber and a throat and an expansion nozzle for the rocket engine connected together to produce thrust from burning of a fuel with an oxidizer;
   a turbine rotatably connected to a fuel impeller and an oxidizer impeller;
   the fuel impeller and the oxidizer impeller each having a high pressure outlet and a low pressure outlet;
   a fuel low pressure pump having an outlet connected to an inlet of the fuel impeller;
   an oxidizer low pressure pump having an outlet connected to an inlet of the oxidizer impeller;
   the high pressure outlets for the fuel impeller and the oxidizer impeller being connected to the main combustion chamber;
   an inlet of the fuel low pressure pump connected to the low pressure outlet of the fuel impeller; and, an inlet of the oxidizer low pressure pump connected to the low pressure outlet of the oxidizer impeller.

2. The rocket engine of claim 1, and further comprising:
the fuel and oxidizer low pressure pumps both being jet pumps.

3. The rocket engine of claim 1, and further comprising:
the fuel and oxidizer impeller both being a centrifugal impeller with an axial inlet and radial outlets.

4. The rocket engine of claim 1, and further comprising:
the impellers for both the fuel impeller and the oxidizer impeller having low pressure blades integral with high pressure blades.

* * * * *

UNITED STATES PATENT AND TRADEMARK OFFICE
CERTIFICATE OF CORRECTION

PATENT NO. : 8,613,189 B1
APPLICATION NO. : 12/627663
DATED : December 24, 2013
INVENTOR(S) : Philip C. Pelfrey and Alex Pinera It is certified that error appears in the above-identified patent and that said Letters Patent is hereby corrected as shown below:

Column 1, line 15, above the heading "BACKGROUND OF THE INVENTION" insert

--This invention was made with Government support under contract number FA9300-09-D-0003 0001 awarded by the US Air Force. The Government has certain rights in the invention.--

Signed and Sealed this
Fifteenth Day of March, 2016

Michelle K. Lee
*Director of the United States Patent and Trademark Office*